United States Patent [19]
Suckow

[11] 4,366,890
[45] Jan. 4, 1983

[54] CLUTCH DISENGAGEMENT SYSTEM
[75] Inventor: David S. Suckow, Decatur, Ill.
[73] Assignee: Caterpillar Tractor Co., Peoria, Ill.
[21] Appl. No.: 250,752
[22] PCT Filed: Jun. 30, 1980
[86] PCT No.: PCT/US80/00826
  § 371 Date: Jun. 30, 1980
  § 102(e) Date: Jun. 30, 1980
[87] PCT Pub. No.: WO82/00184
  PCT Pub. Date: Jan. 21, 1982
[51] Int. Cl.³ ................ B60K 41/02; F16D 25/08
[52] U.S. Cl. ................ 192/0.096; 192/67 R; 192/85 CA; 192/91 A; 192/101
[58] Field of Search ............ 192/0.096, 3.57, 91 A, 192/101, 70.3, 85 CA, 85 C, 70.28, 70.22, 70.23, 67 R, 99 R, 0.052, 36

[56] References Cited
U.S. PATENT DOCUMENTS

| | | |
|---|---|---|
| 1,131,401 | 3/1915 | MacPherson ................ 192/101 X |
| 2,777,328 | 1/1957 | Wagner . | 
| 2,983,346 | 5/1961 | Weymann ................ 192/0.096 |
| 3,333,665 | 8/1967 | Einchcomb et al. ............ 192/99 R |
| 3,334,717 | 8/1967 | Spokas et al. ................ 192/113 B |
| 3,379,291 | 4/1968 | Randol ........................... 192/0.052 |
| 3,783,301 | 1/1974 | Nieukirk . |
| 3,854,559 | 12/1974 | Talak et al. ................... 192/4 A |
| 3,897,984 | 8/1975 | Matheny . |
| 4,192,411 | 3/1980 | Fogelberg ...................... 192/36 |
| 4,195,716 | 4/1980 | Wirt ............................... 192/4 A |
| 4,293,061 | 10/1981 | Brown ........................... 192/85 CA |

Primary Examiner—George H. Krizmanich
Attorney, Agent, or Firm—Phillips, Moore, Lempio & Finley

[57] ABSTRACT

A hydraulically operated drive engagement means (20,63) interposed between an engine (10) and a transmission (12) to permit the transmission (12) to be disconnected from the engine (10) during starting. The drive engagement means (20,63) is particularly useful during cold weather starts, and in those transmissions not ordinarily requiring disengagement from the engine. In order to minimize the weight and space requirements, a lockout feature (63) prevents engagement or disengagement of a drive engagement means (20,63) while the engine (10) is running.

25 Claims, 4 Drawing Figures

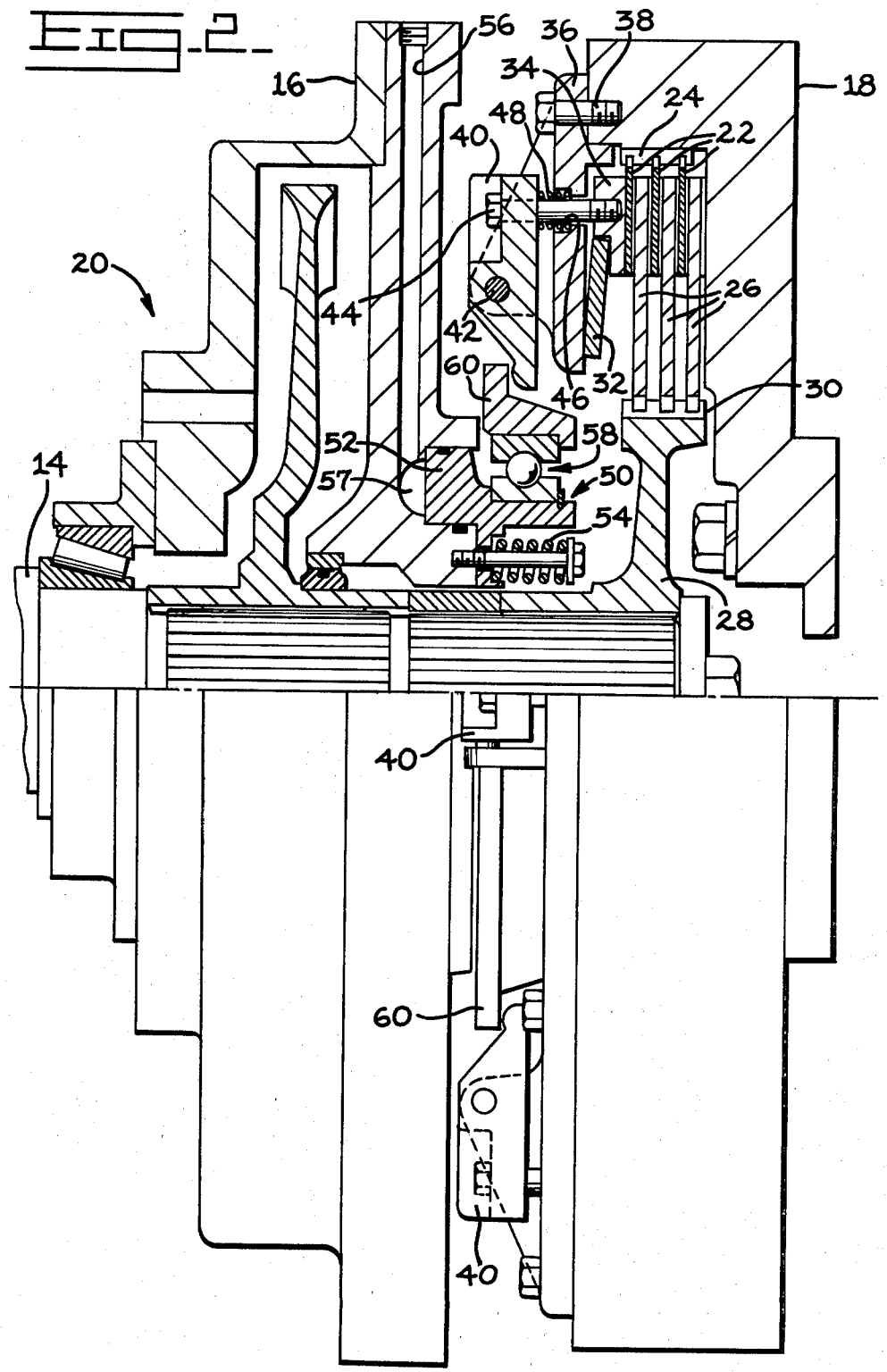

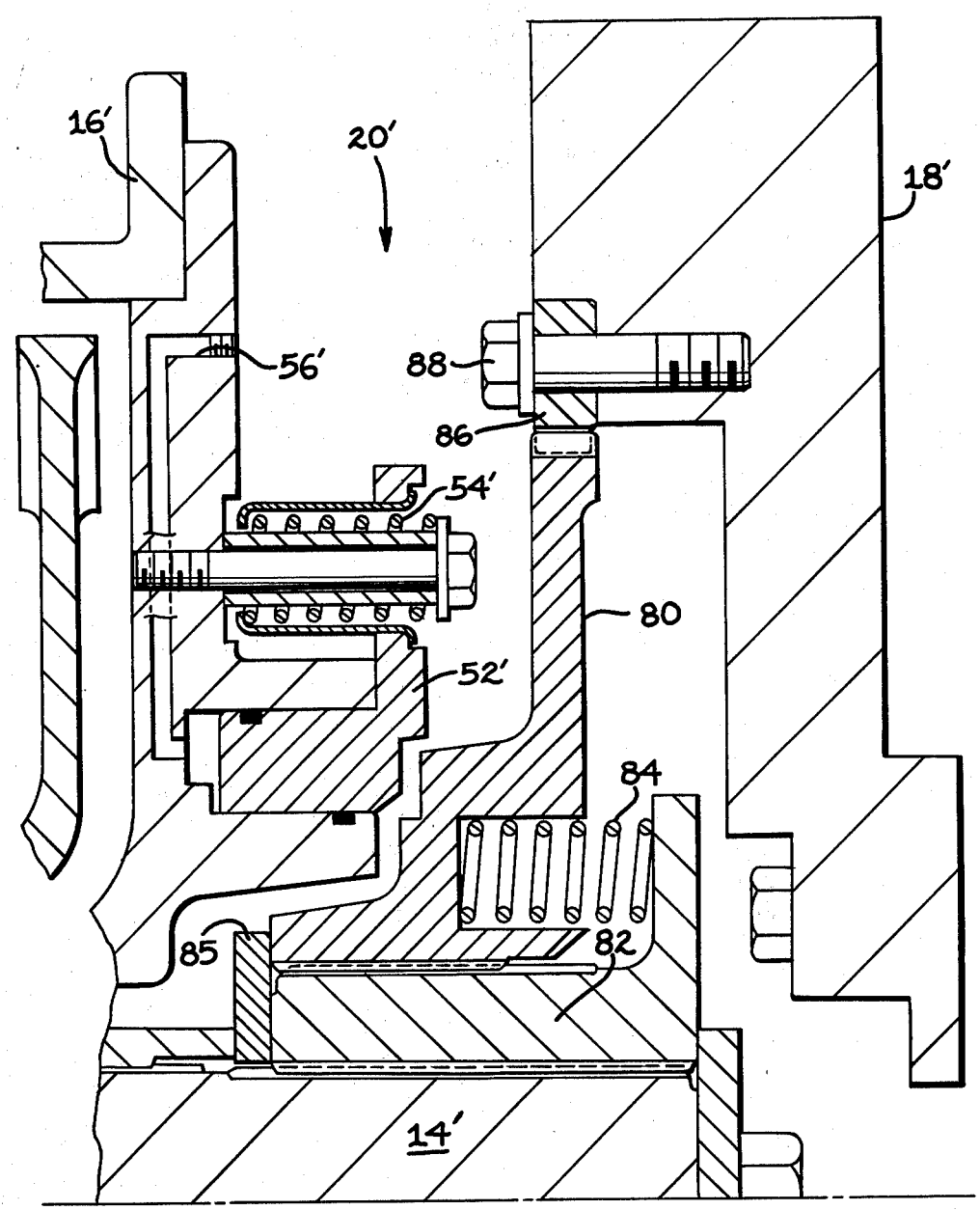

CLUTCH DISENGAGEMENT SYSTEM

DESCRIPTION

1. Technical Field

This invention relates to a drive disengagement system. In particular, it relates to a drive engagement device positioned between an engine and a transmission for disengagement of the engine and transmission before cold weather starting and the associated controls for preventing either disengagement or re-engagement of the device with the engine running.

2. Background Art

Cold weather starting of vehicle engines imposes a heavy and, in some cases, a severe load on the starter motor and the batteries. The extra load requirement is primarily attributable to thickened engine lubricant resulting from the low-ambient temperature. Of course there is also loss of battery power due to the decreased temperature. However, this loss is relatively less compared to the increased power requirements due to cold engine lubricant. Experimentation has shown that battery power drops approximately sixty-five percent (65%) between 80° F. (26° Celsius) and −20° F. (−29° Celsius) while engine drag may increase by a factor of 3.5 for the same temperature change.

In those vehicles having a transmission composed primarily of planetary units, the normal starting load is increased because, even with the transmission in neutral, a portion of the transmission must also be turned over along with the engine. Such transmissions, generally found in heavy construction vehicles and the like, include brakes for stopping one or more reaction members in the planetary gear arrangements in order to obtain differing output speeds. Ordinarily, during warm weather starting, the lubricant in such transmissions has little effect on engine starting. During cold weather, particularly subzero weather, the viscosity of the transmission lubricant may be sufficiently high to preclude normal starting.

Past efforts to solve cold-weather starting problems have been marginally successful and have usually required extra effort or additional equipment. In some instances, such efforts have required unnecessary and tedious work. One method for cold weather starting is to utilize a crankcase heater. Such heaters are generally of the immersion type and require an electrical power source. In large vehicles having large capacity oil sumps in both the engine crankcase and the transmission, immersion type heaters, in order to be effective, would have to be relatively large.

Another method of cold weather starting is to heat the entire engine block by forced air, or by ensuring that the vehicle is parked in a heated building when not in use. In both the forced air method of overcoming cold weather starting problems and the immersion heater method, there exists a requirement for additional equipment such as electrical generators, gas heaters, or large garages. In the arctic construction arena, such facilities are generally not available.

In order to utilize such vehicles in extremely cold climates, such as found in the arctic, or the northern tier of the United States, where temperatures may range to and below −40° F. (−40° Celsius), operators has resorted to several makeshift arrangements. In one instance, the drive shaft connecting the vehicle engine to the transmission has been disconnected. Thus, the starter and battery are only put under a load in relation to the vehicle engine. Once the vehicle engine has reached an acceptable operating temperature, the engine is stopped and the drive shaft reconnected to the vehicle engine. The engine is then restarted and the transmission is warmed up. This solution has a serious drawback in that the flywheel housing bearing may be starved for oil until the drive shaft is reinstalled.

Another way to overcome the viscosity of cold transmission lubricant is to add additional batteries to the system to develop a high starting power for the length of time necessary to start the engine. Although this solution is acceptable from the point of view of providing sufficient power to turn the engine over, the load on the single starter may be such that the effective life of the starter is appreciably shortened. In order to avoid this problem, a second starter system complete with additional batteries has been tried. Although workable, the two starter solution adds to the basic weight and requires modification of the normal starting system. Since space may be at a premium, the addition of batteries may not be possible without a complete redesign of the engine compartment.

Finally, mention should be made of conventional clutching systems for disengagement of the engine from the drive line for the purpose of shifting gears in a transmission relying primarily on nonplanetary gearing. While such a clutching system would, on the surface, appear to be useful as a solution to the described problem, it would ordinarily be superfluous in planetary transmissions as such transmissions need not be disengaged from the drive line to change gear ratios. Moreover, a conventional clutch would require a massive drive engagement device along with an associated housing and a larger drive shaft if engagement or disengagement can occur with the engine running. Furthermore, inadvertent disengagement and subsequent engagement of the clutch while the engine is running could prove hazardous. Therefore, the desiderata is a relatively compact lightweight drive engagement device for connecting the engine with the transmission along with a control system that would prevent disengagement or re-engagement of the drive engagement device while the engine was running.

The present invention is directed to overcoming one or more of the problems set forth above.

DISCLOSURE OF THE INVENTION

In one aspect of this invention, an improved drive engagement means is provided in a vehicle having an engine, a transmission, and a drive shaft connecting the engine with the transmission. The improved drive engagement means permits disengagement of the engine from the drive shaft only while the engine is stopped.

This improvement permits engine starting and warm-up during extreme cold weather conditions without imposing the load of the transmission on the vehicle starter. Re-engagement is prevented until after the engine is stopped. Thus, the engine may be warmed in isolation of the transmission. After engine warm-up and with the vehicle engine stopped, the transmission may be re-engaged with the engine and the engine restarted for warm-up of the transmission lubricant.

BRIEF DESCRIPTION OF THE DRAWINGS

FIG. 2 is a plan view partly in section of a particular embodiment of the drive engagement means described herein.

FIG. 3 is a second embodiment of the drive engagement means described herein.

BEST MODE OF CARRYING OUT THE INVENTION

Figure 1:
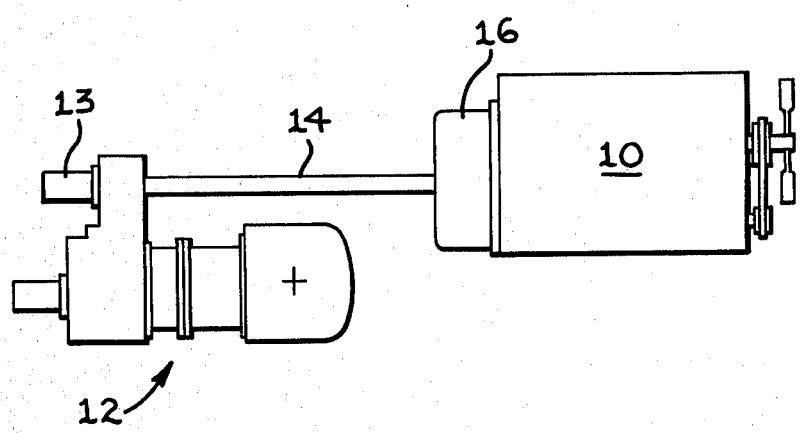
FIG. 1 is a schematic view of an embodiment of the present invention showing a vehicle engine, a drive shaft, a transmission and the inventive drive engagement means.

In FIG. 1 an engine 10 drives a transmission 12 and a pump 13 through an elongated drive shaft 14. Fixed to engine 10 is a flywheel housing 16 which contains a flywheel 18 (see FIGS. 2 and 4) rotatable by engine 10.

In the past, engine 10 has been drivingly connected directly to drive shaft 14 which in turn is drivingly connected to transmission 12. Transmission 12 may be of the type described in U.S. Pat. No. 3,347,113 issued Oct. 17, 1967 to C. A. Ramsel and assigned to the assignee of this invention. Such a transmission utilizes planetary gearing systems in which the reaction elements are braked in order to attain different gearing ratios. These planetary gearing systems do not require a conventional clutch between the engine and the transmission because a "neutral" condition is obtained by selective braking or, in some instances, clutching one or more of the internal transmission elements. In such a transmission, the various unbraked planetary units ordinarily rotate continuously; thus, during cold weather operations, it takes considerable additional power during starting to overcome the sluggishness of the viscous lubricant contained in the transmission. Accordingly, during cold weather starts drive shaft 14 has been removed to enable the engine to be started and warmed up. In this invention, a drive engagement means such as a clutch assembly 20 (see FIGS. 2 and 4) has been interposed between flywheel 18 and drive shaft 14.

Clutch assembly 20 is comprised of a plurality of interleaved discs in the manner of a conventional disc clutch. Specifically, a group of discs 22 are fixed for rotation to flywheel 18 by a plurality of splines 24, which permit axial movement thereof as may be appreciated by viewing FIG. 2, while ensuring continued rotation with flywheel 18. Interleaved between each disc 22 is a corresponding disc 26 affixed to a spider or clutch support plate 28 by means of a plurality of splines 30 in the same manner as discs 22 are affixed to flywheel 18. Clutch support plate 28 is, in turn, splined to shaft 14.

Interleaved discs 22 and 26 are normally urged into driving engagement by a Belleville washer 32 so that shaft 14 rotates with flywheel 18. Belleville washer 32 engages, at one end, an annular clutch piston or pressure plate 34 which contacts the plurality of interleaved discs. At the other end Belleville washer 32 engages a spring backing plate 36 which is affixed to flywheel 18 by, for example, bolts 38.

Clutch assembly 20 is disengaged by a plurality of levers 40 pivotally mounted on spring backing plate 36 by pivot pins 42. A stud 44 extends through a hole 46 formed in spring backing plate 36 thereby connecting each lever 40 with pressure plate 34. A resilient member, such as helical spring 48, is interposed between spring backing plate 36 and each lever 40 to bias lever 40 in a counterclockwise direction away from spring backing plate 36. It should be noted that the helical springs 48 have a lower spring constant than Belleville washer 32. Thus, helical springs 48 have little effect on the normal engagement of clutch assembly 20 resulting from the bias of Belleville washer 32.

Each lever 40 is rotated in a counterclockwise direction as shown in FIG. 2 by a piston and bearing assembly 50. Piston and bearing assembly 50 includes an annular piston 52 mounted in housing 16 for rightward and leftward movement as indicated in FIG. 2. A resilient member such as helical spring 54 normally biases annular piston 52 to the left for seated engagement with housing 16. Means such as passage 56 are formed in housing 16 to provide fluid to an annular cavity 57 for selectively urging annular piston 52 to the right.

Mounted on annular piston 52 is a bearing assembly which includes bearing 58 and a ring 60, so that upon movement of annular piston 52 to the right under the influence of pressure provided at cavity 57, ring 60 contacts lever 40 to rotate lever 40 in a counterclockwise direction, thus disengaging clutch assembly 20 so that flywheel 18 may rotate independently of shaft 14. Bearing 58 permits relatively frictionless association of piston 52 and lever 40.

Figure 4:
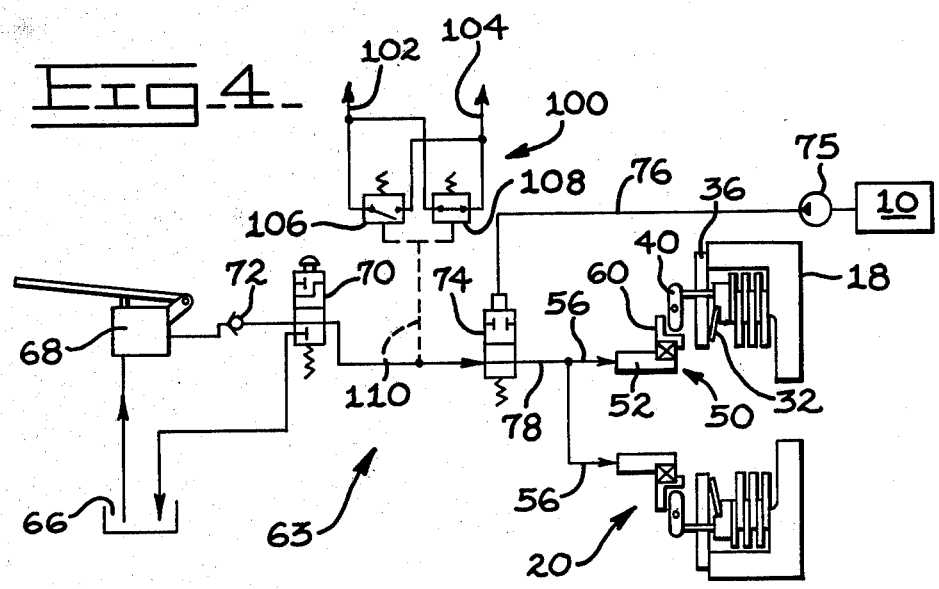
FIG. 4 is a schematic diagram of the hydraulic circuit necessary to operate the drive engagement means described herein.

Referring now to FIG. 4, a control means or actuating means 63, is shown schematically. Actuating means 63 permits engagement or disengagement of clutch assembly 20 only while engine 10 is stopped. Specifically, a source of fluid contained in a sump 66 is in communication with a hand pump 68 used to pressurize the fluid. Pressurized fluid is communicated to a hold and release valve 70 through a one-way check valve 72. Hold and release valve 70 is ordinarily biased to the open position as indicated in FIG. 4.

Fluid from hold and release valve 70 is communicated to a blocker or interlock valve 74 which also is normally biased to the open position. Interlock valve 74 is pilot operated by fluid pressurized by a pump 75 driven by engine 10 and communicated to interlock valve 74 by means of a conduit 76 leading to the pilot portion of interlock valve 74. Pump 75 may be any fluid pump driven by engine 10 but is preferably the engine oil pump. With interlock valve 74 normally open before engine startup, fluid is communicated under pressure from hand pump 68 to pass through interlock valve 74 to a conduit 78 which leads to passage 56 in flywheel housing 16. It can be seen that passage 56 can be pressurized by hand pump 68 and pressure maintained therein by either check valve 72 or while the engine is running by fluid under pressure in conduit 76 piloting interlock valve 74 to a closed position.

Hold and release valve 70 which is shown in FIG. 4 in the normally open position can be operable manually, as shown, or by other means. Actuation of hold and release valve 70 releases pressure downstream of hold and release valve 70. Should interlock valve 74 be open as indicated in FIG. 4, the pressure will be released in passage 56 and thus piston 52 will move leftwardly for engagement of clutch assembly 20. If interlock valve 74 is closed because engine 10 is running, pressure will be maintained in passage 56; thus clutch assembly 20 will remain disengaged until engine 10 is stopped and pressure is relieved in conduit 76.

While not necessary for the purpose of engaging and disengaging the engine from the transmission, an additional pressure actuated starter cut-out circuit 100 may be included. Cut-out circuit 100 is wired in series with the vehicle starter (not shown) by means of electrical leads 102 and 104. Pressure actuated switches 106 and 108 interconnect leads 102 and 104 such that the circuit is complete with either switch closed. A pilot line 110 pressurized by hand pump 68 actuates switches 106 and 108. In particular, normally closed switch 108 is opened when a predetermined pressure, say for example 20 psi ($1.37 \times 10^5$ Pa), is present in pilot line 110. Normally open switch 106 remains open until a predetermined pressure, sufficient to disengage clutch 20, say for example 400 psi ($2.75 \times 10^6$ Pa), is present in pilot line 110. Thus the engine cannot be started unless pressure is either below a first predetermined level or above a second higher predetermined level. Therefore, this circuit 100 permits actuation of the starter only with the clutch 20 fully engaged or fully disengaged.

A SECOND MODE FOR CARRYING OUT THE INVENTION

Referring now to FIG. 3, a second mode for carrying out the invention is shown. In FIG. 3, the drive engagement means 20' includes a drive spider 80 which is drivingly associated with shaft 14'. Drive spider 80 is splined for sliding engagement on a spring retainer ring 82 which itself is splined to shaft 14', so that rotation imparted to drive spider 80 is delivered through spring retainer ring 82 to drive shaft 14'. Disposed between spring retainer ring 82 and drive spider 80 is a resilient biasing means, such as helical spring 84, biasing drive spider 80 leftwardly against a stop 85 as indicated in FIG. 3.

At its outer periphery, drive spider 80 is splined in the manner of a gear for mating engagement with an internally toothed ring gear 86, which is affixed by appropriate means to flywheel 18'. In this instance, internally toothed ring gear 86 is fixed to flywheel 18' by bolts 88.

Mounted on housing 16' is an actuating piston 52' which is biased to the left as indicated in FIG. 3 by a helical spring 54'. Piston 52' is urged rightwardly by fluid pressure communicated to passage 56' acting on the left face of piston 52'. Thus, application of fluid pressure in passage 56' urges piston 52' to the right for engagement with drive spider 80. Such engagement urges drive spider 80 rightwardly for disengagement of the peripheral drive splines of the drive spider 80 from internally toothed ring gear 86. Upon release of pressure in passage 56', piston 52' is urged leftwardly by resilient member 54', while helical spring 84 urges drive spider 80 leftwardly. Should there be a mismatch, that is a tooth to tooth engagement, of the spline connection between drive spider 80 and internally toothed ring 86, actuation of the starter motor of the associated engine 10 will rotate flywheel 18' permitting drive spider 80 to engage with the internally toothed ring gear 86 with a minimum of rotation.

INDUSTRIAL APPLICABILITY

In both described embodiments, use would be most appropriate in heavy construction equipment utilized in arctic climates. A specific application would be in a wheeled tractor wherein the transmission was of the type that ordinarily is rotated continuously during engine operation.

In operation, the operator of the vehicle would actuate hand pump 68 to provide pressure to check valve 72 and hold and release valve 70. Such fluid pressure would be further communicated through lockout valve 74 to disengage drive engagement means 20 or 20' as the case may be. The operator would then proceed with the normal starting procedure for engine 10, having isolated the engine from the pumps 13 and/or transmission 12. Ordinary lubrication takes place at drive engagement means 20 or 20' precluding oil starvation of the flywheel, which had occurred in instances where the drive shaft 14 had been manually disconnected from the flywheel. Once engine 10 reaches a normal operating temperature, the operator shuts the engine down. It should be noted that pressure has been retained in conduit 78 and passageway 56 or 56' throughout the entire starting and warming operation, before starting by check valve 72 and during the operation of the engine by pressure in conduit 76 closing lockout valve 74. Thus, it is not possible for the operator to re-engage drive engagement means 20 or 20' while the engine is operating.

Once the engine is shut down, pressure will drop in conduit 76, opening valve 74 to its normally open position as indicated in FIG. 4. The operator may then actuate hold and release valve 70 to dump fluid pressure in passage 56 or 56' and conduit 78 into sump 66. With such an action, drive engagement means 20 or 20' will re-engage shaft 14 with flywheel 18. The operator then restarts the engine and warms up the transmission in the normal manner.

If the starter cut-out circuit 100 is included, the clutch must be either fully engaged or fully disengaged before the starter may be energized.

It is important to understand that the drive engagement means have been designed in the manner described above to (1) save space and (2) to reduce weight. Because of this lightweight construction of the drive engagement means, it is not feasible to engage or disengage the drive engagement means during operation of the engine. Nevertheless, the inclusion of a clutch such as described above serves two additional purposes not available to those installations not ordinarily requiring a clutch, such as a typical planetary transmission. The clutch assembly 20 can provide limited slip between the engine and the drive shaft 14 during a shift to a lower torque and, further, in an elongated drive shaft environment, which is present in some heavy construction vehicles, the clutch assembly can serve to dissipate energy by slipping if the drive line gets into a resonant frequency condition. Thus, the addition of the clutch assembly for use in the cold weather environment may serve two additional purposes.

It should be apparent to those skilled in the art that a normally disengaged clutch would work equally well with this invention. In such an installation the spring bias would disengage the clutch while fluid pressure would engage the clutch.

Other aspects, objects, and advantages of this invention can be obtained from a study of the drawings, the disclosure and the appended claims.

I claim:

1. In a vehicle having an engine (10), a transmission (12), and a drive shaft (14) drivingly connecting said engine (10) with said transmission (12), the improvement comprising drive engagement means (20,63) for permitting disengagement of said engine from said drive shaft (14) only prior to the engine running and for preventing re-engagement of said engine and said drive shaft when said engine is running.

2. The improvement of claim 1 wherein said drive engagement means (20,63) comprises lockout means (63,74) responsive to said engine for preventing disengagement of said engine (10) from said drive shaft (14) with said engine running (10).

3. The improvement of claim 2 wherein said drive engagement means (20,63) further includes a normally engaged clutch (20).

4. The improvement of claim 3 wherein said drive engagement means (20,63) further includes lever means (40) for disengaging said clutch (20).

5. The improvement of claim 4 wherein the engine (10) includes a flywheel (18), and further wherein said clutch (20) comprises a plurality of interleaved discs (22,26), one of said discs (22) being fixed to said flywheel (18) and the next adjacent disc (26) being associated with said drive shaft (14), and resilient means (32) for urging said adjacent discs (22,26) into engagement one with another, the lever means (40) including a lever (40) being pivotally affixed to said flywheel (18) and movable to oppose said resilient means (32).

6. The improvement of claim 5 wherein the drive engagement means (20) further includes a movable piston (52) being adapted to move the lever (40) to oppose said resilient means (32).

7. The improvement of claim 6 wherein the drive engagement means (20,63) further includes bearing means (58) for permitting generally frictionless association of said movable piston (52) and said lever (40).

8. The improvement of claim 7 wherein the drive engagement means (20,63) further includes means (56,57) for selectively providing fluid under pressure to said piston (52), said fluid under pressure urging said movable piston (52) into engagement with said lever.

9. The improvement of claim 2 wherein said engine (10) includes a flywheel (18'), said flywheel (18') having an internally toothed ring gear (86), and further wherein the drive engagement means (20,63) includes an externally splined drive spider (80), said spider being slidably splined to the drive shaft (14'), said externally splined drive spider (80) being adapted to engage said internally toothed ring gear (86), and resilient biasing means (84) for normally baising said externally splined drive spider (86) into engagement with said internally toothed ring gear (86).

10. The improvement of claim 2 wherein said drive engagement means (20,63) comprises a normally engaged clutch (20) and hydraulic means (66,68) for disengaging said normally engaged clutch (20) and, further, wherein said lockout means (63) blocks communication between said hydraulic means (66,68) and said normally engaged clutch (20).

11. The improvement of claim 10 wherein said lockout means (63) includes hold and release valve means (70), for relieving said hydraulic means (66,68).

12. A drive engagement system for connecting an engine (10) to a transmission (12) comprising:
   a rotatable driving member interconnected to said engine (18);
   a driven shaft (14) interconnected to said transmission;
   drive engagement means (20) for disengaging said driven shaft (14) from said driving member (18); and
   lockout means (63) for preventing disengagement or re-engagement of said driven shaft (14) with said driving member (18) while said driving member (18) is rotating.

13. The drive engagement system of claim 12 wherein said drive engagement means (20,63) comprises a normally engaged clutch (20) and hydraulic means (66,68) for disengaging said normally engaged clutch (20) and, further, wherein said lockout means (63) blocks communication between said hydraulic means (66,68) and said normally engaged clutch (20).

14. The drive engagement system of claim 13 wherein said lockout means (63) includes hold and release valve means (70), for relieving said hydraulic means (66,68).

15. A drive engagement system for a vehicle having an engine (10) and a transmission (12), the drive engagement system comprising:
   a driving member (18) connected for rotation with said engine (10);
   a shaft connected for rotation with said transmission (12);
   drive engagement means (20) for disengaging said shaft from said driving member; and
   locking means (63) for preventing disengagement or re-engagement of said shaft (14) with said driving member (18) while said engine (10) is running.

16. A drive engagement system for a vehicle having an engine (10) and a transmission (12), the improvement comprising:
   clutch means (20) for selectively connecting the engine (10) and the transmission (12), the clutch means (20) having an engaged position and a disengaged position; and
   control means (63) for moving the clutch means (20) to the disengaged position solely when the engine (10) is not running and for preventing the movement of said clutch means from a disengaged position (20) to the engaged position when the engine is running.

17. The drive engagement system of claim 16 wherein the control means (63) includes first means (66,68) for supplying fluid under pressure to the clutch means (20) for moving the clutch means (20) to the disengaged position, and second means (70) for relieving the pressure to the clutch means (20) and permitting moving of the clutch means (20) to the engaged position solely when the engine (10) is not running.

18. The drive engagement system of claim 16 wherein the control means (63) includes a source (66,68) of fluid pressure and conduit means (78,56) for communicating the pressure source (66,68) with the clutch means (20) for disengagement thereof.

19. The drive engagement system of claim 18 wherein the control means (63) includes valve means (74,75,76) for blocking the conduit means (78,56) solely when the engine (10) is running.

20. The drive engagement system of claim 19 wherein the control means (63) includes pressure release valve means (70) for selectively relieving pressure in the conduit means (78,56).

21. The drive engagement system of claim 16 wherein the control means (63) includes a source (66) of fluid, a hand pump (68) connected to the source (66), and conduit means (78,56) connecting the hand pump (68) and the clutch means (20).

22. The drive engagement system of claim 21 wherein the control means (63) includes a hold and pressure release valve (70) in the conduit means (78,56).

23. The drive engagement system of claim 22 wherein the control means (63) includes an interlock valve (74) in the conduit means (78,56), the interlock valve (74) having a blocking position interrupting fluid flow in the conduit means (78,56) and being movable to the blocking position in response to operation of the engine (14).

24. In a vehicle having an engine (10) a transmission (12) and a drive shaft (14) drivingly connecting said engine (10) with said transmission (12), the improvement comprising:
drive engagement means (20, 63) for permitting disengagement of said engine from said drive shaft (14) only prior to starting said engine and for preventing the engagement of said engine and said drive shaft after said engine is started;
said drive engagement means (20, 63) including a normally engaged clutch (20), a source of fluid pressure (66, 68) for selectively disengaging said clutch and interlock valve means (74, 76) responsive to said engine for blocking said disengaging fluid pressure from said clutch while said engine is running.

25. The improvement of claim 10 wherein said lockout means include an interlock valve (74) for disableing said hydraulic means (66, 68) in response to operation of the engine (14).

* * * * *